United States Patent [19]
Ettlinger et al.

[11] Patent Number: 4,482,642
[45] Date of Patent: Nov. 13, 1984

[54] PROCESS FOR THE PRODUCTION OF SLUGS OF PYROGENICALLY PRODUCED OXIDES

[75] Inventors: Manfred Ettlinger, Rodenbach; Horst Ferch, Bruchkobel; Detlev Koth, Grenzach-Wyhlen; Edgar Simon, Freigericht-Neuses, all of Fed. Rep. of Germany

[73] Assignee: Degussa Aktiengesellschaft, Frankfurt, Fed. Rep. of Germany

[21] Appl. No.: 406,525

[22] Filed: Aug. 9, 1982

[30] Foreign Application Priority Data

Aug. 19, 1981 [DE] Fed. Rep. of Germany ....... 3132674

[51] Int. Cl.[3] ............................................. B01J 21/06
[52] U.S. Cl. .................................... 502/232; 502/242; 502/263; 502/439
[58] Field of Search ................ 502/232, 242, 263, 439

[56] References Cited

U.S. PATENT DOCUMENTS

| | | | |
|---|---|---|---|
| 2,438,379 | 3/1948 | Archibald et al. | 502/263 |
| 2,930,762 | 3/1960 | Schoenenberger | 502/159 |
| 3,033,801 | 5/1962 | Kloepfer et al. | 502/263 |
| 3,333,776 | 8/1967 | Rauner . | |
| 3,334,062 | 8/1967 | Brown . | |
| 3,393,155 | 7/1968 | Schutte . | |
| 3,547,832 | 12/1970 | Hass et al. | 502/439 |
| 3,907,512 | 9/1975 | Ziegenhain et al. | 502/439 |
| 4,052,334 | 10/1977 | Mockett | 502/439 |
| 4,280,929 | 7/1981 | Shaw et al. | 502/232 |

FOREIGN PATENT DOCUMENTS

| | | |
|---|---|---|
| 12063 | 6/1980 | European Pat. Off. . |
| 927535 | 5/1963 | United Kingdom . |

OTHER PUBLICATIONS

Koth, Chem. Tech. 52 (1980), No. 8, pp. 628–634.

*Primary Examiner*—Delbert E. Gantz
*Assistant Examiner*—Cynthia A. Prezlock
*Attorney, Agent, or Firm*—Cushman, Darby & Cushman

[57] ABSTRACT

Pressed objects (slugs) of pyrogenically produced oxides such as $SiO_2$, $Al_2O_3$ and $TiO_2$ are produced using a silica sol and water. As molding assistants thereby there is employed a polyhydric alcohol, e.g. glycerine or sorbitol. The water can be added adsorbed on a pyrogenically produced hydrophobized silica. The pressed object obtained can be used inter alia as catalyst carrier.

17 Claims, No Drawings

PROCESS FOR THE PRODUCTION OF SLUGS OF PYROGENICALLY PRODUCED OXIDES

BACKGROUND OF THE INVENTION

The invention is directed to the production of pressed objects (slugs) from pyrogenically produced oxides of metals and/or metalloids.

These oxides are of high purity and extremely finely divided. The average primary particle sizes (DIN 53206) (German Industrial Standard 53206) as a rule is between 7 and 40 millimicrons. The high purity, the lack of pores and the substantially chemical inertness have made the pyrogenically produced oxides interesting as carriers for catalysts. Examples of this use have long been known in the scientific literature (see the review of Koth et al. in Chem. Ing. Techn. Vol. 52 (1980) pages 628-634). However, in all cases the pyrogenically produced oxide was employed in powder form.

Previously it was not possible to produce pressed objects from highly dispersed pyrogenic oxides, which because of the inner surface area and their mechanical strength would be suited as catalyst carriers.

To be sure there is known from German OS No. 2625705 a process for the production of a pellet shaped catalyst carrier which is characterized by heating a shaped product made from a mixture of finely divided silicon dioxide powder and colloidal silicon dioxide for the purpose of hardening. In regard to the silicon dioxide powder employed, however, there is used a silica whose particle size is from 0.5-100 micrometers.

Experiments using this process on pyrogenically produced metal or metalloid oxides having a particle size of 7-40 millimicrons are described in Koth, Chem. Ing. Techn. Vol. 52 (1980) at pages 633-634.

However, this process has the disadvantage that, e.g. from a pyrogenic silica (Aerosil 200) there can only be prepared pellets having a maximum breaking strength of 4.3 kp. An additional disadvantage is that compared to the starting material there must be accepted a reduction of the accessible surface area of somewhat more than 25%. Pressed objects of pyrogenically produced aluminum oxide ($Al_2O_3$-C) are likewise described in the mentioned Koth article. They have a breaking strength of 5.6 kp.

The production of pressed objects from pyrogenically produced oxides accordingly appears to be possible only by making allowance for the low breaking strength and the great decrease of the surface area compared to the starting material.

The object of the invention is to form pressed objects (e.g. slugs, pellets or briquettes) from pyrogenically produced oxides which have a high breaking strength and a surface area which is only a little below that of the starting material.

SUMMARY OF THE INVENTION

The invention is directed to a process for the production of pressed objects (e.g. slugs, pellets or briquettes) from a pyrogenically produced oxide in which the pyrogenically produced oxide of a metal and/or metalloid is present, then intensively mixed with water, silica sol and a mold assistant, the mixture in a given case converted to powder form, the thus produced flowable powder shaped by pressing, the pressed objects obtained slowly dried at temperatures up to 100° C. and the pre-dried pressed objects subsequently tempered at a temperature of 450°-700° C., which process is characterized by using a polyhydric alcohol.

During the preliminary drying the water present in the pressed articles is vaporized until there is present 10%, preferably 5% of the amount employed originally in the mixture.

In principle all mixers or mills are suited for carrying out the process of the invention which make possible a good homogenization, such as e.g. paddle mixers, fluidized bed mixers, gyro mixers or air swept mixers. Especially suited are mixers with which there is possible an additional compacting of the material being mixed, e.g. plowshare mixers, edge mills or ball mills.

Thereby the liquid components can be sprayed on the oxide present in the apparatuses mentioned or can be dosed in other suitable form.

It can also be advantageous in a first step to intensively mix in a portion or all of the oxide to be worked in with a part of the other components of the mixture and then in a second step to complete the process by addition of the still missing amounts of material of the mixture for the production of the pressed objects of the invention.

As mold assistants there are employed polyhydric alcohols of which there are preferred ethanediol, glycerin, erythritol, pentitols, e.g. xylitol and arabinitol, hexitols, such as, e.g. sorbitol. Other polyhydric alcohols which can be used include mannitol, propylene glycol pentaerythritol, trimethyleneglycol and butyleneglycol.

The predried pressed objects can be tempered at a temperature of 450° to 700° C., preferably 500° to 600° C.

In further preferred illustrative forms of the process of the invention there are used as the pyrogenically produced metalloid oxide or metal oxide silica, aluminum oxide or titanium dioxide. As binder there is used silica sol.

As an example of a silica sol which can serve for the production of the pressed objects produced according to the invention there may be mentioned Ludox HS 40 which is characterized by the following data:

| | |
|---|---|
| Average particle size | 13-14 Millimicrons |
| Spec. surface area | 210-230 $m^2/g$ |
| Water portion | 60% |
| pH | 9.4 |

In a preferred illustrative form a portion of the water can also be added to the mixture in a form bound to a pyrogenically produced, hydrophobized silica such as Aerosil R 972. The hydrophobizing agent in Aerosil R 972 is made by hydrophobizing pyrogenically produced silica with dimethyldichlorosilane made according to Brunner German AS No. 1163784.

Illustrative of other suitable hydrophobized pyrogenically produced silicas are those disclosed in Brown U.S. Pat. No. 3,334,962, Schutte U.S. Pat. No. 3,393,155 and Diether German AS No. 1667460. Illustrative hydrophobizing agents are also known in Rauner U.S. Pat. No. 3,333,776 and Brown U.S. Pat. No. 3,334,062. The entire disclosures of the Brown U.S. patent, Rauner U.S. patent, Schutte U.S. patent, Brunner German AS and Diether German AS set forth above are hereby incorporated by reference and relied upon.

As hydrophobizing agents there can be employed, for example, alkyl, alkenyl or aryl or mixed alkyl-aryl halosilanes, e.g., dimethyldichlorosiliane, ethyltrichlorosilane, amyltrichlorosilane, vinyltrichlorosilane, phenyltrichlorosilane, methyltrichlorosilane, methylvinyl dichlorosilane, trimethylchlorosilane, diphenyldichlorosilane, bistrichlorosilyl-ethane, bis-trichlorosilylbenzene, amyltriethoxysilane, vinyltriethoxysilane, phenyltriethoxysilane, dimethyldiethoxysilane, diphenyldiethoxysilane, betacarbethoxyethyltriethoxysilane and beta-carbethoxypropylmethyldiethoxysilane phenyldimethylethoxysilane, phenylmethyl dimethoxysilane; a cyclic siloxane of the formula $(R_2SiO)_3$ where R is monovalent hydrocarbon, monovalent beta-fluoralkylethyl or monovalent haloaryl radical, e.g. R can be methyl, ethyl, isopropyl, t-butyl, hexyl, octadecyl, vinyl, allyl, methallyl, hexenyl, butadienyl, cyclopentyl, cyclobutyl, cyclohexenyl, organo silazane, e.g. hexamethylcyclotrisilazane, phenylmethyloctasilazane, hexamethyldisilazane, hexylpolysilazane, triorganosilylacylates, such as vinyldimethylacetoxyslane; 1,3-divinyltetramethyldisiloxane, 1,3-diphenyltetramethyldisiloxane and 1,3-diphenylhexamethyldisilazane.

Likewise there can be used octamethylcyclotetrasiloxane and/or in the terminal units always dimethylpolysiloxanes with 2 to 12 siloxane units per molecule, containing an Si-bound hydroxyl group, silicon oils which consist of linear organopolysiloxanes. The free valencies of the silicon not bound to oxygen may be satisfied by organic groups such as $CH_3$—, $C_6H_5$— or hydrogen. Their viscosity at 20° C., may be between 3 and 1000 cP, e.g. between 20 and 500 cP, or between 20 and 100 cP.

In the case of using the hydrophobized silica there is obtained a free-flowing powder, without the need of partially vaporizing the water employed, which powder subsequently can be pressed.

The relative amounts of the components needed for the production of mixtures having a suitable consistency depends to a certain extent on the type of pyrogenically produced oxide employed and the size of its specific surface area.

It is suitable to regulate the water content of the mixture to between 5 and 50 weight % based on the total amount. The proportion by weight of the mold assistant can be between 2 and 30%, preferably the range is between 2 and 10 weight %. If the mixture is not present in powder form after the production about 40–55% of the water present in the mixture, is evaporated, until a flowable powder is obtained.

The products produced according to the process of the invention can then be employed as catalyst carriers.

Generally 50–60% of the pressed object volume consists of accessible pore space. This means, that e.g. pressed objects made of pyrogenically produced silica which on the average have a volume of 0.38 $cm^3$, in water take up about 0.22 $cm^3$ of liquid.

The process of the invention furthermore has the advantage that the pressed objects produced have a breaking strength of at least 6 kp and thus e.g. in bulk catalysts are capable of resistance to mechanical stress. At the same time the pressed objects have a high surface area which is only slightly below the surface area value of the starting oxide to a limited extent. A certain lowering of this value in the compressing is unavoidable. According to the process of the invention this reduction can be limited to a maximum of 18% of the starting value and thereby simultaneously there is produced a high breaking strength as pointed out above.

The following examples serve to further explain the present invention.

The surface area values given were determined according to DIN 66131, the breaking strength was measured with a breaking strength tester of the type ZE/205 of the firm Dr. K. Schenninger.

Unless otherwise indicated all parts and percentages are by weight.

The process can comprise, consist essentially of or consist of the stated steps with the materials set forth.

DETAILED DESCRIPTION

EXAMPLE 1

100 grams of Aerosil 150 (specific surface area 155 $m^2/g$) in a plowshare mixer were sprayed with a mixture of 130 grams of water, 50 grams of silica sol Ludox HS 40 and 20 grams of glycerine. Then these materials were mixed for 10 minutes. The thus obtained mixture was heated for 3 hours at 90° C. in a drying oven, thereby about 80 grams of water evaporated. The powder was compressed on a Korsch eccentric press with a die diameter of 9 mm, a matrix filling height of 17 mm and a pressing pressure of about 0.664 metric tons.

The pressed objects were left for about 20 hours at room temperature, whereby the greatest parts of the water (about 75 grams) escaped.

The pressed objects were tempered for 40 minutes at 550° C., whereby they reached a breaking strength of 7.5 kp. The specific surface area on the average 129 $m^2/g$ ($\triangleq -16.8\%$ compared to Aerosil 150). The pressed objects per piece took up about 0.22 $cm^3$ of water at a total volume on the average of 0.38 $cm^3$. This signifies an accessible pore volume of 58%.

EXAMPLE 2

The process of Example 1 was repeated except that there were used 20 grams of sorbitol as the mold assistant and a temperature of 600° C.

The pressed objects likewise showed a breaking strength of 7.5 kp. The surface area on the average was 132 $m^2/g$ ($\triangleq -14.8\%$ compared to Aerosil 150). The pressed objects per piece took up about 0.23 $cm^3$ at a total volume on the average of about 0.38 $cm^3$. This signifies an accessible pore volume of 60%.

EXAMPLE 3 (Comparison Example)

The process was the same as in Example 1 except without the mold assistant.

The pressed objects had a breaking strength of 2 kp and an average specific surface area of 131 $m^2/g$ ($\triangleq -15.5\%$ compared to Aerosil 150).

EXAMPLE 4

The process of Example 1 was repeated but using Aerosil 200 (specific surface area 212 $m^2/g$), 170 grams of water, 75 grams of silica sol Ludox HS 50 and 30 grams of glycerine.

The pressed objects had a breaking strength of 6 kp and an average specific surface area of 181 $m^2/g$ ($\triangleq -14.6\%$ compared to Aerosil 200).

EXAMPLE 5

The process of Example 1 was repeated but using 100 grams of aluminum oxide C (specific surface area 110

$m^2/g$), 50 grams of water, 20 grams of silica sol Ludox HS 40 and 5 grams of glycerine.

The tablets showed a breaking strength of 6 kp and an average specific surface area of 104 $m^2/g$ ($\triangleq -5.5\%$ compared to $Al_2O_3$-C).

EXAMPLE 6

100 grams of titanium dioxide P 25 (specific surface area 46 $m^2/g$) were blended in an edge mill under slow grinding with a mixture of 10 grams of water, 10 grams of silica sol Ludox HS 40 and 5 grams of glycerine.

Then the mixture was combined with 2.5 grams of a powder made of 15% Aerosil R 972 (hydrophobic pyrogenic silica) and 85% water in a turbulent mixer.

The flowable powder obtained was compressed on a Korsch eccentric press having a die diameter of 9 mm, a matrix filling height of 17 mm and compressing pressure of about 0.5 metric tons.

The pressed objects were allowed to dry for about 20 hours at room temperature. Then they were tempered for 40 minutes at 550° C. The crushing strength of the finished tablets was 15 kp and the specific surface area on the average 38 $m^2/g$ ($\triangleq -17.4\%$ compared to $TiO_2$ P 25).

The entire disclosure of German priority application No. P 31326474.9 is hereby incorporated by reference.

What is claimed is:

1. A process for the production of a pressed object from a pyrogenically produced oxide which is an oxide of a metal, an oxide of a metalloid or a mixture thereof comprising intensively mixing the pyrogenic oxide with water, silica sol and a polyhydric alcohol as a mold assistant which is ethanediol, glycerine, erythritol, pentitol or hexitol, and forming a flowable powder from the mixture, shaping the flowable powder by pressing to form a pressed object, slowly predrying the pressed object at a temperature up to 100° C. and subsequently tempering the predried pressed object at 450°–700° C.

2. A process according to claim 1 wherein the pyrogenic oxide is pyrogenically produced silica, aluminum oxide or titanium oxide.

3. A process according to claim 1 wherein the polyhydric alcohol is used in an amount of 2 to 30% of the weight of the total mixture.

4. A process according to claim 3 wherein the polyhydric alcohol is used in an amount of 2 to 10% of the weight of the total mixture.

5. A process according to claim 3 wherein the polyhydric alcohol is glycerine or sorbitol.

6. A process according to claim 2 wherein the compressing is carried out to produce a pressed object having 50–60% of the volume as accessible pore space.

7. A process according to claim 2 wherein there is employed pyrogenically produced silica.

8. A process according to claim 2 wherein there is employed pyrogenically produced aluminum oxide.

9. A process according to claim 2 wherein there is employed pyrogenically produced titanium dioxide.

10. A process according to claim 2 wherein a portion of the water is employed in a form bound to a pyrogenically produced hydrophobized silica.

11. A process according to claim 1 wherein a portion of water is employed in a form bound to a pyrogenically produced hydrophobized silica.

12. A pressed object prepared by the process of claim 1.

13. A pressed object prepared by the process of claim 2.

14. A pressed object prepared by the process of claim 3.

15. A pressed object prepared by the process of claim 6.

16. A pressed object prepared by the process of claim 10.

17. A pressed object produced by the process of claim 11.

* * * * *